Dec. 27, 1927.
W. R. HILL
1,653,768
SPUR OR PROD FOR HORSES
Filed April 29, 1927
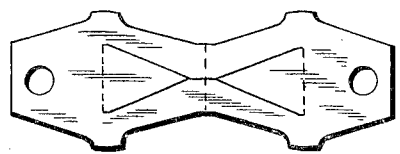
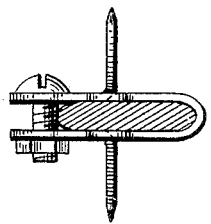  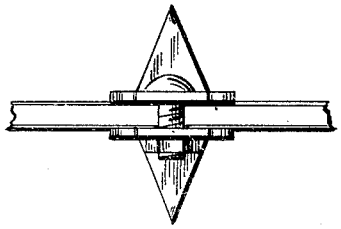
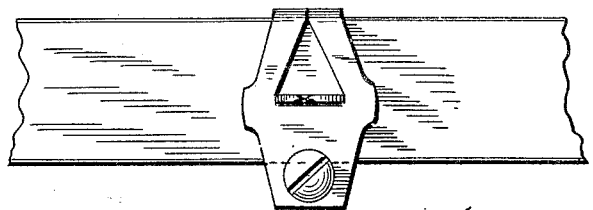
Inventor:
William R. Hill.

Patented Dec. 27, 1927.

1,653,763

UNITED STATES PATENT OFFICE.

WILLIAM R. HILL, OF VERDI, MINNESOTA.

SPUR OR PROD FOR HORSES.

Application filed April 29, 1927. Serial No. 187,659.

This invention comprehends the attachment of a metal spur or prod to the rein or line of a harness for horses, by means of which the animal can be spurred or prodded to activity without the necessity of using a whip or other means other than the spur or prod on the line, and without releasing the rein or line from the hand of the driver. The flipping of the line causes the spur or prod to strike the animal; the objects of the invention are to spur or prod the horse without the use of a whip; to spur or prod the horse without releasing hold on the rein or line; to spur one horse of a team of horses without exciting the other horse of the team; to have the spur attached to and as a part of the harness thus making it unnecessary to have more than one spur for several vehicles.

The nature and advantages of the invention will be better understood when the following detailed description is taken in connection with the drawing, the invention residing in the construction, combination and relationship of the parts as claimed.

In the drawing forming part of this specification,

Figure 1 is a view of the metal stamping or plate from which the invention is formed, looking upon the stamp or plate before same is bent into its ultimate shape to conform to the shape of the rein or line of the harness as shown in Figure 2, the two triangular parts shown in Figure 1 being cut through the metal along the sides of the triangle and bent outward until the two points are lateral from the bases of the triangle to form the spurs.

Figure 2 is an end view of the metal stamping after the ends have been bent towards each other with spurs to the outside. It then becomes a clamp with spurs on same to be attached to the line or rein by means of the bolt through the same as shown.

Figure 3 is a side view of the spur or prod for horses shown as attached to the line or rein of a harness, and showing the two triangular spurs as attached to the line or rein by means of a bolt.

Figure 4 is a view of the spur or prod attached to the line or rein looking upon the flat surface of the line.

In practise the spur may be moved to various positions along the length of the line or rein by loosening the bolt shown in Figure 2, then moving the spur to the desired position and then tightening the bolt so as to clamp the spur tightly to the rein.

While I have shown and described what I consider to be the preferred embodiment of the invention, I desire to have it understood that I do not limit myself in this connection, and that such changes may be resorted to when desired as fall within the scope of what is claimed.

What I claim is:

A metal clamp with spurs attached formed to conform to the shape of a line or rein for harness for horses and bolted securely to the line or rein at any position along the length of line or rein that may be desired by the user, the metal spurs on the clamp forming a spur or prod.

In testimony whereof I affix my signature.

WILLIAM R. HILL.